(12) United States Patent
Chappidi

(10) Patent No.: US 11,348,052 B2
(45) Date of Patent: May 31, 2022

(54) CLOUD COMPUTING ACCOUNT MANAGEMENT AND CONTROL AGGREGATION OF NOTIFICATIONS AND SERVICE LIMITS

(71) Applicant: Capital One Services, LLC, McLean, VA (US)

(72) Inventor: Shashi Chappidi, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/226,223

(22) Filed: Apr. 9, 2021

(65) Prior Publication Data

US 2021/0224715 A1 Jul. 22, 2021

Related U.S. Application Data

(63) Continuation of application No. 16/516,691, filed on Jul. 19, 2019, now Pat. No. 10,977,596.

(51) Int. Cl.
*G06F 16/9535* (2019.01)
*G06Q 10/06* (2012.01)
*G06F 16/9538* (2019.01)
*G06F 16/2457* (2019.01)

(52) U.S. Cl.
CPC . *G06Q 10/06393* (2013.01); *G06F 16/24578* (2019.01); *G06F 16/9535* (2019.01); *G06F 16/9538* (2019.01)

(58) Field of Classification Search
CPC .......... G06Q 10/06393; G06F 16/9535; G06F 16/24578; G06F 16/9538
See application file for complete search history.

(56) References Cited

U.S. PATENT DOCUMENTS

| | | | |
|---|---|---|---|
| 10,304,061 B1 * | 5/2019 | Shanmugam | G06Q 30/016 |
| 10,938,661 B1 * | 3/2021 | Pignataro | H04L 41/5045 |
| 2018/0091586 A1 * | 3/2018 | Auradkar | H04L 67/1095 |
| 2020/0064153 A1 * | 2/2020 | Kagan | G01D 4/004 |
| 2020/0133698 A1 * | 4/2020 | Permenter | G06F 11/3438 |
| 2020/0236129 A1 * | 7/2020 | Barkovic | H04L 41/142 |
| 2020/0274782 A1 * | 8/2020 | Balaiah | H04L 67/2833 |

\* cited by examiner

*Primary Examiner* — Viet D Vu
(74) *Attorney, Agent, or Firm* — KDB

(57) ABSTRACT

The present disclosure provides aggregation of management and control of multiple cloud service accounts. The operating environment provides aggregation of notifications, support tickets, utilization status, and can provide an aggregated alert system for such information related to the cloud service accounts. A computing system can communicatively couple to multiple cloud service accounts and can receive notifications of issues and generate alerts accordingly.

20 Claims, 8 Drawing Sheets

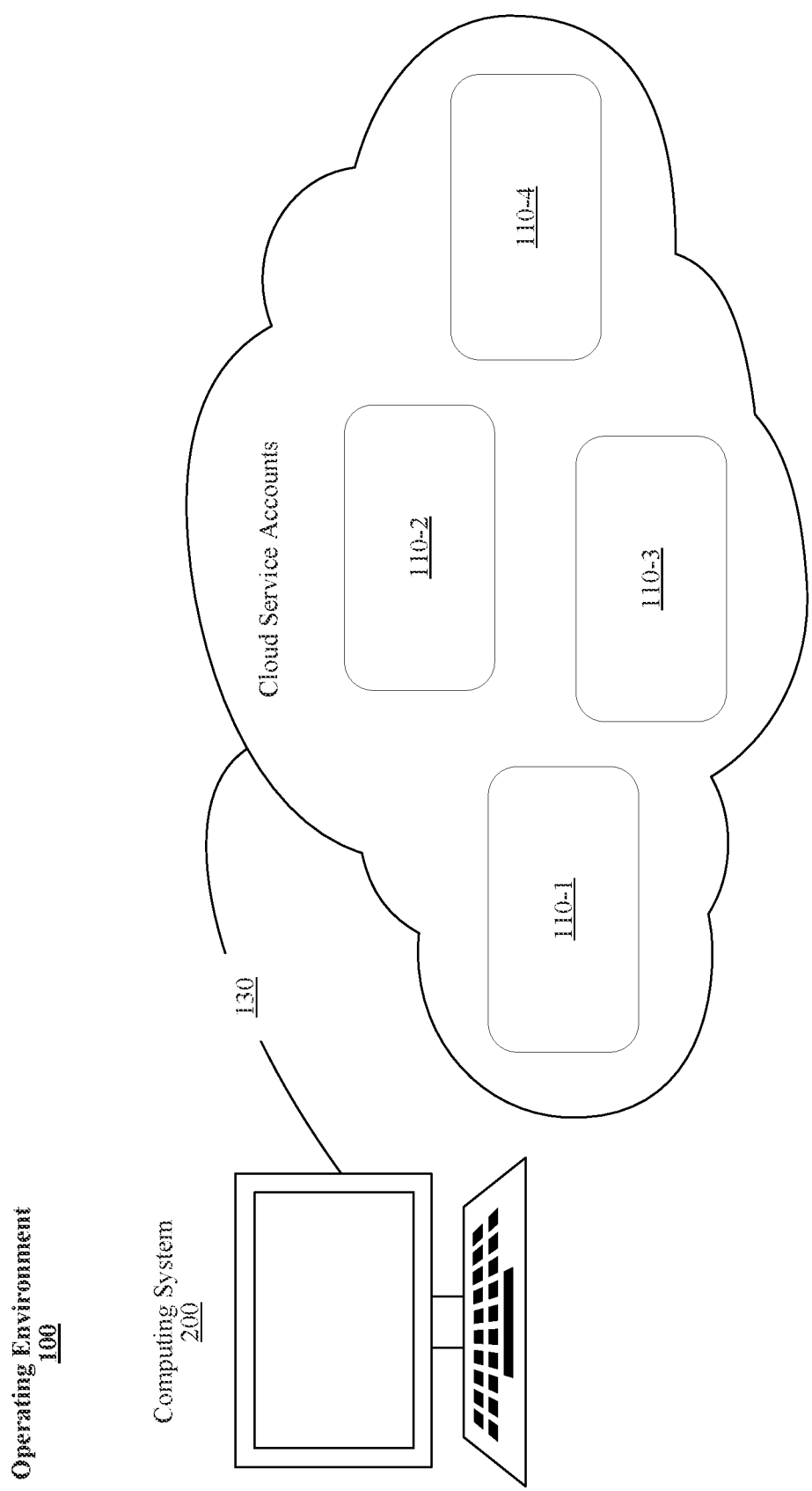

_600_

```
Receive a service metric for each of a number of cloud service accounts,
wherein each of the cloud service accounts comprise a service limit.
610
```

↓

```
Generate a service limit map based in part on the service metric and the
service limit for each of the cloud service accounts.
620
```

Receive at least one support ticket associated with one or more of a number of cloud service accounts.
710

Add indications of the number of support tickets to a support database.
720

Receive a support ticket query.
730

Query the support database based in part on the support ticket query.
740

Send a query response including indications of a one of the number of support tickets represented in the support database.
750

*FIG. 7*

CLOUD COMPUTING ACCOUNT MANAGEMENT AND CONTROL AGGREGATION OF NOTIFICATIONS AND SERVICE LIMITS

RELATED APPLICATIONS

This application is a continuation of U.S. Pat. No. 10,977,596, titled "CLOUD COMPUTING ACCOUNT MANAGEMENT AND CONTROL AGGREGATION" filed on Jul. 19, 2019. The contents of the aforementioned application are incorporated herein by reference.

BACKGROUND

Many enterprises utilize cloud computing services and software as a service resources to perform business functions. Larger enterprises often rely on multiple different such services, which necessitates user different interfaces and portals to manage each individual cloud or software service. Furthermore, many large enterprises rely on multiple accounts of the same service, such as, multiple accounts with the same cloud computing service provider.

Management and control of such a large number of accounts often requires individually logging into an account management portal for each account and each service. This creates an enormous burden for managing such accounts as scale.

BRIEF DESCRIPTION OF THE DRAWINGS

FIG. 1 illustrates an operating environment.
FIGS. 5-7 illustrate logic flows.

DETAILED DESCRIPTION

The present disclosure provides for a single portal with which to manage and control multiple cloud computing service and/or software as a service accounts, even from different providers. With some implementations, a computing system can be arranged to receive, via a network interconnect, notifications from a number of cloud service accounts. The computing system can be arranged to generate a heat map including indications of the various notifications. For example, the computing system can receive notifications from a number of cloud service accounts, such as, issues, account notifications, scheduled changes, or the like. The computing system can generate the heat map to provide a reporting and/or visualization of these various notifications across all the cloud service accounts. With some examples, the heat map can provide an indication of a criticality rank and a cloud service account impacted for the various notifications. Furthermore, the computing system can be arranged to identify an alert pathway for each of the various notifications and, based on the identified criticality rank, send an alert via the alert pathway.

FIG. 1 illustrates an example of an operating environment 100 that may be representative of various embodiments. The operating environment 100 depicted in this figure may include an illustrative computing system 200 arranged to aggregate management and control of numerous cloud service accounts 110-n, where n is a positive integer greater than 2. As used herein, "cloud service account" can include any of a variety of cloud based accounts, such as, cloud computing accounts, cloud hosting accounts, cloud datacenter accounts, software as a service accounts, or the like.

Operating environment 100 can include any number of cloud service accounts 110-n. Said differently, computing system 200 can couple to, communicate with, and receive notifications from any of a variety and quantity of cloud service accounts 110-n. This figure depicts cloud service account 110-1, 110-2, 110-3, and 110-4 for convenience and not limitation.

Computing system 200 can communicatively couple with clouds service accounts 110-n via network 130, which can be any of a variety of networks, such as, for example, the Internet.

Figure 3:
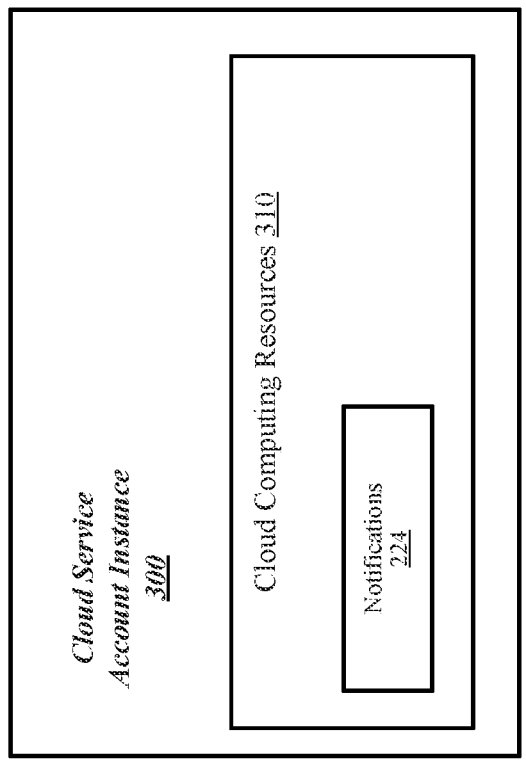
FIG. 3 illustrates a cloud service account instance.
Figure 2:
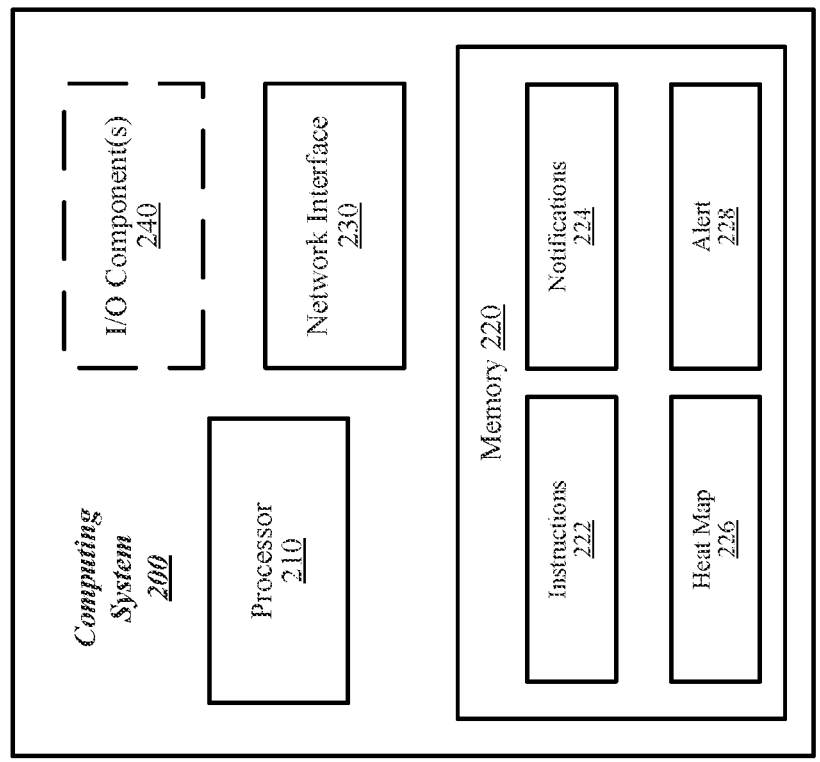
FIG. 2 illustrates a computing system.

FIG. 2 depicts an example of computing system 200 and FIG. 3 depicts an example of a cloud service account portal 300, which can represent one of the cloud service accounts 110-n depicted in FIG. 1.

Referring to FIG. 2, computing system 200 can include a processor 210, memory 220, a network interconnect 230, and optionally a display 240. Memory 220 may store instructions 222, which are executable by processor 210. Instructions 222 can correspond to an aggregated cloud service management and control application. Memory 220 may further store notifications 224, a heat map 226, and alert(s) 228.

In general, the processor 210, or circuitry, can be any of a variety of processors, logic devices, or circuitry arranged to process instructions. For example, processor 210 can be a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, or any other microprocessor or central processing unit (CPU). With some examples, processor 210 can be a commercially available central processing unit (CPU), an application specific integrated circuit (ASIC), a field programmable gate arrays (FPGA), or the like. Additionally, processor 210 can be implemented with any number of processor cores. Additionally, in some examples, processor 210 may include graphics processing portions, may include dedicated memory, and/or may include multiple-threaded processing and/or some other parallel processing capability.

The memory 220 may include logic, a portion of which includes arrays of integrated circuits, forming non-volatile memory to persistently store data or a combination of non-volatile memory and volatile memory. It is to be appreciated, that the memory 220 may be based on any of a variety of technologies. In particular, the arrays of integrated circuits included in memory 220 may be arranged to form one or more types of memory, such as, for example, dynamic random access memory (DRAM), NAND memory, NOR memory, or the like.

Network interface 230 may include logic and/or features to support a communication interface. For example, the interface 230 may include one or more interfaces that operate according to various communication protocols or standards to communicate over direct or network communication links. Direct communications may occur via use of communication protocols or standards described in one or more industry standards (including progenies and variants). For example, the interface 230 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

The I/O Component(s) 240 may include one or more components to provide input to or to provide output from the computing system 200. For example, the I/O component(s) 240 may be a keyboard (hardware, virtual, etc.), mouse, joystick, microphone, track pad, button, touch layers of a display, haptic feedback device, camera, microphone, speaker, a display, or the like.

Referring to FIG. 3, cloud service account portal 300 can include cloud computing resources 310, which can be comprised of any of a variety compute processors, memory, accelerators, graphics processors, networking devices, or other such computing resources. In some embodiments, resources 310 can be dedicated resources provisioned by the cloud service providers while in other embodiments, resources 310 can be virtual resources, or portions of resources allocated by the providers. Cloud computing resources, and particularly, memory of cloud computing resources can store notifications 224. More particularly, during operation of cloud account, notifications 224 can be generated. In general, notifications can include any of a variety of items for which notice is provided by the cloud service provider to the cloud service account holder. For example, notifications 224 can include issues, account notifications, scheduled changes, etc.

Referring to FIGS. 1, 2, and 3, during operation, computing system 200 can communicatively couple to cloud service accounts 110-1, 110-2, 110-3, and 110-4. For example, for each cloud service account 110-n, computing system 200 can communicatively couple to a cloud service account portal 300 associated with the cloud service account 110-n. Computing system 200 can couple to the clouds service accounts 110-n via network 130 to manage and/or control cloud service accounts 110-n. In particular, computing system 200 can be arranged to aggregate information related to the multiple cloud service accounts 110-n and provide indications of the aggregated information. Examples of such are described in greater detail below.

Figure 4:
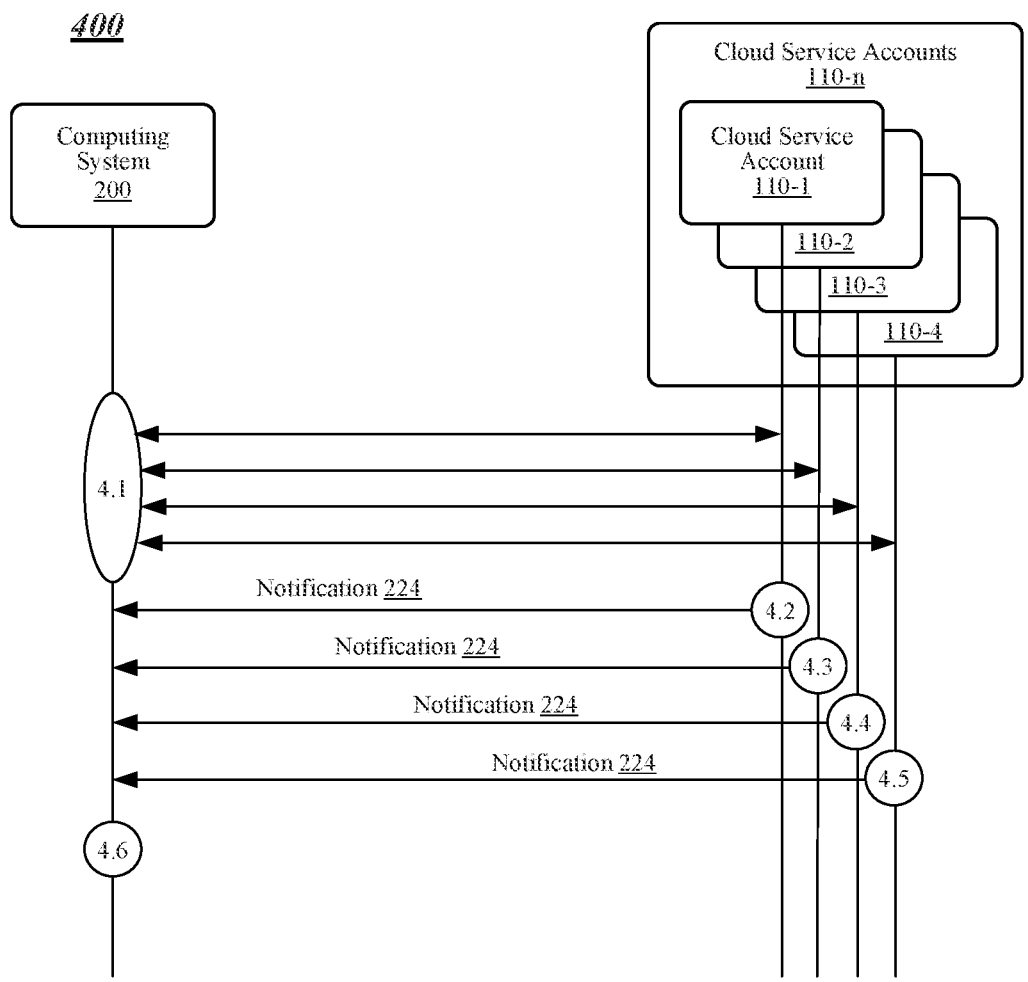
FIG. 4 illustrates a technique.

FIG. 4 illustrates a technique 400 to aggregate management and control of cloud service accounts. Technique 400 is described with reference to computing system 200 and cloud service accounts 110-n depicted in FIGS. 1 and 2. However, technique 400 could be implemented by a computing system having a different configuration than depicted in this figure. Technique 400 can begin at circle 4.1. At circle 4.1, computing system 200 can couple to multiple cloud service accounts, such as, cloud service accounts 110-1, 110-2, 110-3, and 110-4. More particularly, processor 210, in executing instructions 222, can communicatively couple to clouds service accounts 110-n, for example, via network 130, network interface 230, or the like.

Continuing to circle 4.2, circle 4.3, circle 4.4, and circle 4.5, computing system 200 can receive notifications 224 from the cloud service accounts. In general, notifications 224 can include indications of various aspects, issues, announcements, alerts, or otherwise for the cloud service account 110-n for which the alert is received.

Continuing to circle 4.6, computing system 200 can provide aggregated management and/or control of cloud service accounts 110-n. In general, processor 210, in executing instructions 222, can extract, analyze, and process information (e.g., notifications 224), for example, based on natural language processor or the like. Furthermore, processor 210, in executing instructions 222 can predict future states of the cloud service accounts 110-n based on notifications 224, such as, for example, based on machine learning models, or the like.

Figure 5:
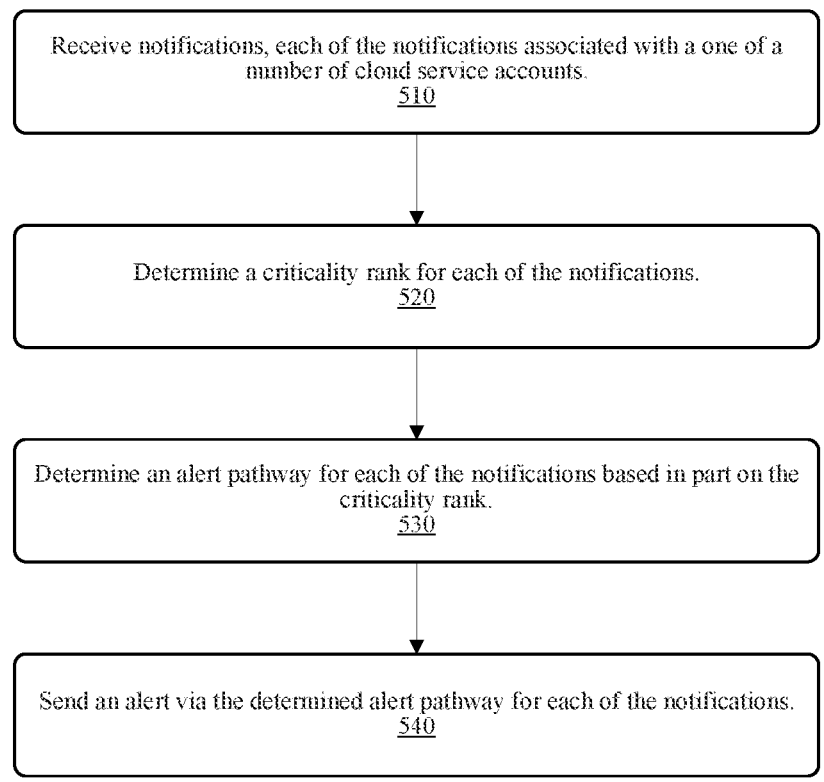

FIGS. 5-7 illustrate logic flows, which can be implemented by a computing system to aggregate management and/or control according to the present disclosure. Specifically, FIG. 5 illustrates a logic flow 500 to aggregate alerts for multiple cloud service accounts; FIG. 6 illustrates a logic flow 600 to aggregate service limits for multiple cloud accounts; and FIG. 7 illustrates a logic flow 700 to aggregate support information for multiple cloud service accounts.

Turning to FIG. 5 and logic flow 500. Computing system 200 can implement logic flow 500. More particularly, processor 210 can execute instructions 222 to implement logic flow 500. Generally, logic flow 500 can be implemented in operating environment 100 to provide an alerting and/or notification mechanism for issues (e.g., critical health events and the impacted resources, or the like) with multiple cloud service accounts. Furthermore, logic flow 500 provides for user (e.g., responsible party, support personnel, or the like) acknowledgement capability (e.g., via an alert pathway, or the like).

Logic flow 500 can begin at block 510. At block 510 "receive notifications, each of the notifications associated with a one of a number of cloud service accounts" computing system 200 can receive a number of notifications 224, for example, where each of the notifications 224 originates from and is associated with a one of the number of cloud service accounts 110-n. Processor 210, in executing instructions 222, can receive notifications 224 from cloud service accounts 110-n (e.g., via network interface 230, or the like).

Continuing to block 520 "determine a criticality rank for each of the notifications" computing device 200 can determine a criticality rank for each of the notifications 224. For example, processor 210 in executing instructions 222 can determine a criticality rank for notifications 224 received at block 510. With some examples, processor 210 can execute instructions 222 to filter out notification that that do not require remediation and/or action (e.g., no action is required for an Amazon Elastic Compute Cloud (EC2) instance where the instance is part of an auto scaling group (ASG)). With some examples, processor 210 can execute instructions 222 to assign a criticality rank of either critical, major, normal, or minor to each notification 224. With some examples, instructions 222 can include heuristics arranged to determine a criticality rank from the notification 224.

In some examples, in executing instructions 222 processor 210 can identify, for each of the plurality of notifications, a notification type and determine the criticality rank based at least in part on the notification type. Examples of some notification types are issue notifications, account notifications, or schedule change notifications.

Continuing to block 530 "determine an alert pathway for each of the notifications based in part on the criticality rank" computing device 200 can determine an alert pathway for each of the notifications 224 based in part on the criticality rank determined at block 520. For example, processor 210 in executing instructions 222 can determine an alert pathway for notifications 224 received at block 510 based on the criticality determined at block 520. With some examples, processor 210 can execute instructions 222 to identify an alert mechanism (e.g., email, text message, phone call, or the like) along with a party or parties with which to send the alert.

Continuing to block 540 "send an alert via the determined alert pathway for each of the notifications" computing device 200 can send the determined alert. For example, processor 210 in executing instructions 222 can send the determined alert via network interface 230. With some examples, processor 210 in executing instructions 222 can determine that no alert is necessary, as such, block 540 can be skipped. In some examples, alerts can be aggregated based on type, based on effected resources, based on alerted party, or based on the cloud service account itself such that the number of alerts is reduced, minimized, or both.

Turning to FIG. 6 and logic flow 600. Computing system 200 can implement logic flow 600. More particularly, processor 210 can execute instructions 222 to implement logic flow 600. Generally, logic flow 600 can be implemented in operating environment 100 to provide indications of service usages and to provide alerting and/or notification for service items with usage above a threshold (or equal to or greater than the threshold, or the like). In some examples, the threshold can be 75% usage, 80% usage, 85% usage, 90% usage, 95% usage, or the like. In some examples, alerts can be spawned where service item limits are unequal between different cloud service accounts, between different regions (e.g., between different regions of Amazon Web Services (AWS) instances, or the like).

Logic flow 600 can begin at block 610. At block 610 "receive a service metric for each of a number of cloud service accounts, wherein each of the cloud service accounts comprise a service limit" computing system 200 can receive service limits for each of cloud service accounts 110-$n$. Processor 210, in executing instructions 222, can receive indications of service limits (e.g., via notifications 224, or the like) for cloud service accounts 110-$n$ (e.g., via network interface 230, or the like). In some examples, service limits can be repeatedly (e.g., on a fixed period, or the like) reported via notifications 224. In some examples, service limits can be queried from each cloud service account by computing system 200.

Continuing to block 620 "generate a service limit map based in part on the service metric and the service limit for each of the cloud service accounts" computing device 200 can generate a service limit map including indications of a utilization of the service limit for each of the cloud service accounts 110-$n$. For example, processor 210 in executing instructions 222 can generate a mapping of service usage for each of the cloud service accounts 110-$n$. In some examples, the service usage can be reported as a ratio of reported usage versus service limits.

In some examples, in executing instructions 222 processor 210 can determine a one of a plurality of regions associated with each of the cloud service account 110-$n$, wherein each of the plurality of regions comprise a regional service limit and can generate the service limit map further based in part on the regional service limit. Additionally, in executing instructions 222 processor 210 can generate a graphical representation of the service limit map and present the graphical representation on a display.

Turning to FIG. 7 and logic flow 700. Computing system 200 can implement logic flow 700. More particularly, processor 210 can execute instructions 222 to implement logic flow 700. Generally, logic flow 700 can be implemented in operating environment 100 to provide cross-account search of all support cases by keywords (e.g., Java, EC2, account name, or the like). Furthermore, logic flow 700 can provide alerting and/or notification for aging support cases or cases awaiting responses from either the cloud service provider or the end user.

Logic flow 700 can begin at block 710. At block 710 "receive at least one support ticket associated with one or more of a number of cloud service accounts" computing system 200 can receive support tickets associated with cloud service accounts 110-$n$. Processor 210, in executing instructions 222, can receive indications of support tickets (e.g., via notifications 224, or the like) service limits for cloud service accounts 110-$n$ (e.g., via network interface 230, or the like).

Continuing to block 720 "add indications of the plurality of support tickets to a support database" computing device 200 can add indications of the support tickets received at block 710 to a support database (e.g., a database stored in memory 220, a database stored on one of cloud service accounts 110-$n$, or the like). For example, processor 210 in executing instructions 222 can add indications of the received support tickets to a database.

Continuing to block 730 "receive a support ticket query" computing device 200 can receive a support ticket query (e.g., from a user, or the like). For example, processor 210 in executing instructions 222 can receive a support ticket query. Continuing to block 740 "query the support database based in part on the support ticket query" computing device 200 can query the support ticket database. For example, processor 210 in executing instructions 222 can query the support ticket database.

Continuing to block 750 "send a query response including indications of the at least one support tickets represented in the support database" computing device 200 can send a response to the query received at block 730. For example, processor 210 in executing instructions 222 can send a response to the support ticket query received at block 730.

In some examples, in executing instructions 222 processor 210 can generate an alert based on the support tickets received. For example, instructions 222 could include one or more machine learning models (e.g., based on pattern recognition, or the like) to identify support tickets needing alerts to provide proactive alerts to users (e.g., along an alert pathway similar to logic flow 500, or the like).

Figure 8:
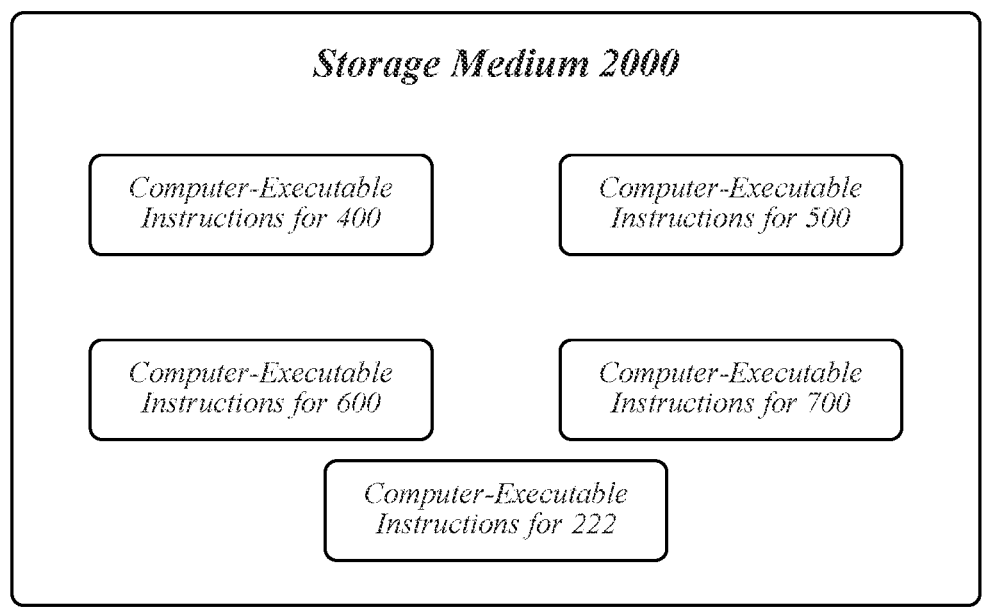
FIG. 8 illustrates a storage medium.

FIG. 8 illustrates an embodiment of a storage medium 2000. Storage medium 2000 may comprise any non-transitory computer-readable storage medium or machine-readable storage medium, such as an optical, magnetic or semiconductor storage medium. In various embodiments, storage medium 2000 may comprise an article of manufacture. In some embodiments, storage medium 2000 may store computer-executable instructions, such as computer-executable instructions to implement one or more of techniques, logic flows, or operations described herein, such as with respect to 400, 500, 600 and/or 700 of FIGS. 4 to 7. The storage medium 2000 may further store computer-executable instructions for instructions 222. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
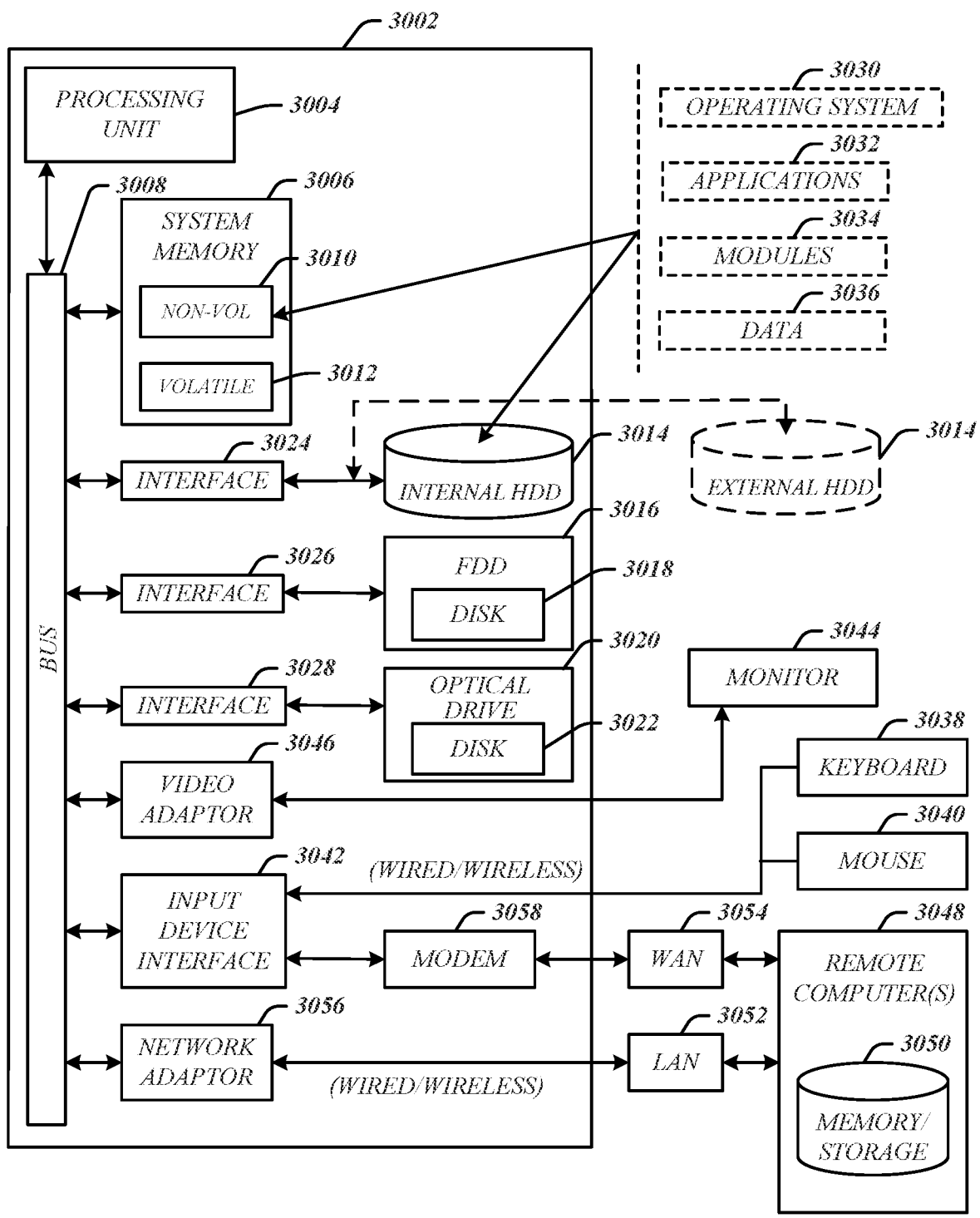
FIG. 9 illustrates a computer architecture.

FIG. 9 illustrates an embodiment of an exemplary computing architecture 3000 that may be suitable for implementing various embodiments as previously described. In various embodiments, the computing architecture 3000 may comprise or be implemented as part of an electronic device. In some embodiments, the computing architecture 3000 may be representative, for example, of a computing device that implements one or more components of computing system 200. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 3000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 3000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 3000.

As shown in this figure, the computing architecture 3000 comprises a processing unit 3004, a system memory 3006 and a system bus 3008. The processing unit 3004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 3004.

The system bus 3008 provides an interface for system components including, but not limited to, the system memory 3006 to the processing unit 3004. The system bus 3008 can be any of several types of bus structure that may further interconnect to a memory bus (with or without a memory controller), a peripheral bus, and a local bus using any of a variety of commercially available bus architectures. Interface adapters may connect to the system bus 3008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 3006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 3006 can include non-volatile memory 3010 and/or volatile memory 3012. A basic input/output system (BIOS) can be stored in the non-volatile memory 3010.

The computer 3002 may include various types of computer-readable storage media in the form of one or more lower speed memory units, including an internal (or external) hard disk drive (HDD) 3014, a magnetic floppy disk drive (FDD) 3016 to read from or write to a removable magnetic disk 3018, and an optical disk drive 3020 to read from or write to a removable optical disk 3022 (e.g., a CD-ROM or DVD). The HDD 3014, FDD 3016 and optical disk drive 3020 can be connected to the system bus 3008 by a HDD interface 3024, an FDD interface 3026 and an optical drive interface 3028, respectively. The HDD interface 3024 for external drive implementations can include at least one or both of Universal Serial Bus (USB) and IEEE interface technologies.

The drives and associated computer-readable media provide volatile and/or nonvolatile storage of data, data structures, computer-executable instructions, and so forth. For example, a number of program modules can be stored in the drives and memory units 3010, 3012, including an operating system 3030, one or more application programs 3032, other program modules 3034, and program data 3036. In one embodiment, the one or more application programs 3032, other program modules 3034, and program data 3036 can include, for example, the various applications and/or components of the wire-free charging system 100.

A user can enter commands and information into the computer 3002 through one or more wire/wireless input devices, for example, a keyboard 3038 and a pointing device, such as a mouse 3040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 3004 through an input device interface 3042 that is coupled to the system bus 3008 but can be connected by other interfaces such as a parallel port, IEEE 994 serial port, a game port, a USB port, an IR interface, and so forth.

A monitor 3044 or other type of display device is also connected to the system bus 3008 via an interface, such as a video adaptor 3046. The monitor 3044 may be internal or external to the computer 3002. In addition to the monitor 3044, a computer typically includes other peripheral output devices, such as speakers, printers, and so forth.

The computer 3002 may operate in a networked environment using logical connections via wire and/or wireless communications to one or more remote computers, such as a remote computer 3048. The remote computer 3048 can be a workstation, a server computer, a router, a personal computer, portable computer, microprocessor-based entertainment appliance, a peer device or other common network node, and typically includes many or all of the elements described relative to the computer 3002, although, for purposes of brevity, only a memory/storage device 3050 is illustrated. The logical connections depicted include wire/wireless connectivity to a local area network (LAN) 3052 and/or larger networks, for example, a wide area network (WAN) 3054. Such LAN and WAN networking environments are commonplace in offices and companies, and facilitate enterprise-wide computer networks, such as intranets, all of which may connect to a global communications network, for example, the Internet.

When used in a LAN networking environment, the computer 3002 is connected to the LAN 3052 through a wire and/or wireless communication network interface or adaptor 3056. The adaptor 3056 can facilitate wire and/or wireless communications to the LAN 3052, which may also include a wireless access point disposed thereon for communicating with the wireless functionality of the adaptor 3056.

When used in a WAN networking environment, the computer 3002 can include a modem 3058, or is connected to a communications server on the WAN 3054, or has other means for establishing communications over the WAN 3054, such as by way of the Internet. The modem 3058, which can be internal or external and a wire and/or wireless device, connects to the system bus 3008 via the input device interface 3042. In a networked environment, program modules depicted relative to the computer 3002, or portions thereof, can be stored in the remote memory/storage device 3050. It will be appreciated that the network connections shown are exemplary and other means of establishing a communications link between the computers can be used.

The computer 3002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

What is claimed is:

1. An apparatus comprising:
at least one processor operable to execute stored instructions that, when executed, cause the at least one processor to:
receive a plurality of notifications, each notification associated with one of a plurality of cloud service accounts;
determine, for each notification, a criticality rank, wherein the criticality rank is assigned as being critical, major, normal, or minor;
query each cloud service account to determine a respective service limit for each cloud service account;
determine a first service limit for a first cloud service account is unequal to a second service limit for a second cloud service account;
generate an alert based on determination the first service limit is unequal to the second service limit;
determine, for each cloud service account, one of a plurality of regions associated with the cloud service account, wherein each of the regions comprise a regional service limit corresponding to at least one of the respective service limits for the plurality of cloud service accounts; and
generate a service limit map based in part on the regional service limit, wherein the service limit map is a heat map providing an indication of the criticality rank and a cloud service account impacted for the plurality of notifications.

2. The apparatus of claim 1, wherein the at least one processor is further caused to:
receive a service metric for each cloud service account, wherein the service limit map is generated further based at least in part on the service metric and the service limit for each cloud service account.

3. The apparatus of claim 1, wherein the at least one processor is further caused to:
determine, for each notification, an alert pathway based at least in part on the criticality rank; and
send, for each notification, an alert via the determined alert pathway.

4. The apparatus of claim 1, wherein the service limit map further comprises indications of utilization of the service limits and utilization of the regional service limits.

5. The apparatus of claim 1, wherein the at least one processor is further caused to:
identify, for each notification, a notification type, and
wherein the determination of the criticality rank is based at least in part on the notification type, and
wherein the notification type comprises issue notifications, account notifications, or schedule change notifications.

6. The apparatus of claim 1, wherein the at least one processor is further caused to:
generate a graphical representation of the service limit map; and
present the graphical representation on a display.

7. The apparatus of claim 1, wherein the at least one processor is further caused to:
receive a plurality of support tickets associated with one or more of the plurality of cloud service accounts; and
add indications of the plurality of support tickets to a support database.

8. The apparatus of claim 7, wherein the at least one processor is further caused to:
receive a support ticket query;
query the support database based in part on the support ticket query; and
send a query response including indications of a one of the plurality of support tickets represented in the support database.

9. At least one computer-readable storage medium comprising instructions that when executed by at least processor cause the at least one processor to:
receive a plurality of notifications, each notification associated with one of a plurality of cloud service accounts;
determine, for each notification, a criticality rank, wherein the criticality rank is assigned as being critical, major, normal, or minor;
query each cloud service account to determine a respective service limit for each cloud service account;
determine a first service limit for a first cloud service account is unequal to a second service limit for a second cloud service account;

generate an alert based on determination the first service limit is unequal to the second service limit;

determine, for each cloud service account, one of a plurality of regions associated with the cloud service account, wherein each of the regions comprise a regional service limit corresponding to at least one of the respective service limits for the plurality of cloud service accounts; and generate a service limit map based in part on the regional service limit, wherein the service limit map is a heat map providing an indication of the criticality rank and a cloud service account impacted for the plurality of notifications.

10. The at least computer-readable storage medium of claim 9, comprising instructions that further cause the processor to:

receive a service metric for each cloud service account, wherein the service limit map is generated further based at least in part on the service metric and the service limit for each cloud service account.

11. The at least computer-readable storage medium of claim 9, comprising instructions that further cause the processor to:

determine, for each notification, an alert pathway based at least in part on the criticality rank; and send, for each notification, an alert via the determined alert pathway.

12. The at least computer-readable storage medium of claim 9, wherein the service limit map further comprises indications of utilization of the service limits and utilization of the regional service limits.

13. The at least one computer-readable storage medium of claim 9, comprising instructions that further cause the processor to:

identify, for each notification, a notification type, and wherein the determination of the criticality rank is based at least in part on the notification type, and wherein the notification type comprises issue notifications, account notifications, or schedule change notifications.

14. The at least one computer-readable storage medium of claim 9, comprising instructions that further cause the processor to:

generate a graphical representation of the service limit map; and present the graphical representation on a display.

15. A method comprising:

receiving a plurality of notifications, each notification associated with one of a plurality of cloud service accounts;

determining, via one or more processors, a criticality rank for each notification, wherein the criticality rank is assigned as being critical, major, normal, or minor;

querying, via the one or more processors, each cloud service account to determine a respective service limit for each cloud service account;

determining, via the one or more processors, a first service limit for a first cloud service account is unequal to a second service limit for a second cloud service account;

generating, via the one or more processors, an alert based on determination the first service limit is unequal to the second service limit;

determining, via the one or more processors, one of a plurality of regions associated with the cloud service account for each cloud service account, wherein each of the regions comprise a regional service limit corresponding to at least one of the respective service limits for the plurality of cloud service accounts; and generating a service limit map based in part on the regional service limit, wherein the service limit map is a heat map providing an indication of the criticality rank and a cloud service account impacted for the plurality of notifications.

16. The method of claim 15, further comprising:
receiving a service metric for each cloud service account, wherein the service limit map is generated further based at least in part on the service metric and the service limit for each cloud service account.

17. The method of claim 15, further comprising:
determining, via the one or more processors, an alert pathway for each notification based at least in part on the criticality rank; and sending, for each notification, an alert via the determined alert pathway.

18. The method of claim 15, wherein the service limit map further comprises indications of utilization of the service limits and utilization of the regional service limits.

19. The method of claim 15, further comprising:
identifying, for each notification, a notification type, and wherein the determination of the criticality rank is based at least in part on the notification type, and wherein the notification type comprises issue notifications, account notifications, or schedule change notifications.

20. The method of claim 15, further comprising:
generating a graphical representation of the service limit map; and presenting the graphical representation on a display.

* * * * *